United States Patent [19]

Ajmera

[11] Patent Number: 4,853,171
[45] Date of Patent: Aug. 1, 1989

[54] METHOD OF MAKING PARTIALLY CRYSTALLINE BIAZIALLY ORIENTED HEAT SET CONTAINERS

[75] Inventor: Prakash R. Ajmera, Toledo, Ohio

[73] Assignee: Owens-Illinois Plastic Products Inc., Toledo, Ohio

[21] Appl. No.: 177,859

[22] Filed: Mar. 24, 1988

Related U.S. Application Data

[63] Continuation of Ser. No. 923,503, Oct. 27, 1986, abandoned.

[51] Int. Cl.$^4$ .................... B29C 49/18; B29C 49/32; B29C 49/64
[52] U.S. Cl. .................................. 264/530; 264/535; 425/530; 425/538
[58] Field of Search .............................. 425/530, 538

[56] References Cited

U.S. PATENT DOCUMENTS

| | | | |
|---|---|---|---|
| 4,066,726 | 1/1978 | Mehnert | 264/530 |
| 4,122,141 | 10/1978 | Krall et al. | 264/530 |
| 4,385,089 | 5/1983 | Bonnebat et al. | 264/529 |

FOREIGN PATENT DOCUMENTS

60-189418 9/1985 Japan .

*Primary Examiner*—Jan H. Silbaugh
*Assistant Examiner*—Neil M. McCarthy

[57] ABSTRACT

A method for making a partially crystalline, biaxially oriented heat set hollow plastic container from a hollow poly(ethylene) terephthalate parison having an open end and a closed end comprising engaging the open end of a plastic parison which is at a temperature within its molecular orientation temperature range, enclosing a hot mold about the hot parison, the mold being at heat setting temperature, expanding the plastic parison within the hot mold by internal pressurization to induce biaxial orientation of the plastic parison and force the plastic parison into intimate contact and conformance with the hot mold and to maintain contact by such internal pressurization between the mold and the biaxially oriented container for a time sufficient to induce partial crystallization in the biaxially oriented container, maintaining a lower internal pressurization of the container to prevent significant shrinkage, opening the hot mold while maintaining engagement of the open end of the blown hollow container, enclosing the blown hollow container in a cold mold having substantially the same volume as the hot mold, or smaller, increasing the pressurization to force the container into intimate contact with the cold mold to cool the container while maintaining internal pressurization and then exhausting the pressure and opening the cold mold. The method results in a thermally stable container.

17 Claims, 4 Drawing Sheets

METHOD OF MAKING PARTIALLY CRYSTALLINE BIAZIALLY ORIENTED HEAT SET CONTAINERS

This application is a continuation of application Ser. No. 923,503, filed Oct. 27, 1986, now abandoned.

This invention relates to making hollow biaxially oriented heat set partially crystalline articles and particularly articles made of poly(ethylene) terephthalate.

BACKGROUND AND SUMMARY OF THE INVENTION

It has heretofore been known that the thermal stability and barrier properties of oriented blow molded containers of poly(ethylene) terephthalate are significantly increased by heat setting. Thermal stability can be of two types, namely first, thermal stability required to fill a container with hot liquids or hot semi-solids without deformation of the container and, second, thermal stability to withstand the pressures of the contents during the shelf life of the filled containers, such as in carbonated beverages, which tend to cause the container to deform or grow with time, commonly known as creep.

In hot-fill applications, the following properties are important: onset of shrinkage; top load; bulge factor; and drop impact. Most of the food products are hot-filled at 85°–120° C. Higher onset-of-shrinkage is required so that the containers would resist shrinkage after hot filling. In addition, filling equipment exerts loads on the containers during filling operation. Since products are filled at elevated temperatures, resistance to higher top load at the filling temperature is required. After the containers are filled, the containers tend to bulge due to the load exerted by the fluid inside the container. Improved top load and bulge factor are obtained by higher mechanical properties. In summary, for hot-fill applications, a combination of higher onset-of-shrinkage and mechanical properties are required.

For beverage applications, the following properties are important: thermal stability; top load; burst test; and drop impact. The containers are filled with carbonated liquids (at a pressure usually 4 volumes) at 40° F. to room temperature. Thermal stability in the case of beverage application is a measure of growth of the container during the shelf life of the container. This is often tested by subjecting the container at 100° F. for 24–48 hours. In general, higher mechanical properties are required to pass the requirements for the beverage applications.

Typical processes for heat setting are shown in U.S. Pats. Nos. 4,476,170, 4,512,948 and 4,522,779.

In U.S. Pats. Nos. 4,476,170 and 4,512,948, there is disclosed an article and a process of making an oriented and heat set blow molded container of poly(ethylene) terephthalate. In the process, a preform preheated to a temperature suitable for orientation is biaxially stretched in a blow mold and then while the hollow container is still in contact with the blow mold walls, the article is raised to a higher heat setting temperature preferably in the range of 200°–250° C. (except for the neck) thus heat setting the container, and while the container is still at a shrinkage resisting pressure exceeding atmospheric, it is cooled in the same mold to a temperature at which is it maintains its shape when not pressurized but not below 100° C. It is also particularly disclosed that this cooling step can be done in the air outside the mold while maintaining internal pressure. According to these patents, when the heat setting temperature of the hot mold ranges from 220°–250° C. and the quenching temperature is not below 100° C., higher onset-of-shrinkage temperatures are obtained. Where quenching is performed in the hot mold, the cycle time is necessarily increased because of the necessity of heating, cooling, and reheating the mold. In addition, the molds are more complex and greater energy is required for heating and cooling. Where cooling is achieved outside of the mold while maintaining internal pressure, added cycle time is required for cooling at ambient temperature. In addition, material distribution may be adversely affected because the container is unconfined during the cooling. In a special embodiment where the cooling step is effected outside the mold, the cooling under the shrinkage resisting pressure is below 100° C., even down to room temperature and lower, before the shrinkage resisting pressure is released form the hollow container, but the maximum benefit of higher onset-of-shrinkage temperature is not realized.

In U.S. Pat. No. 4,522,779, there are disclosed improved plastic containers and a process for their production. In a first embodiment, a container is blow molded in a first hot blow mold, then reblown to a larger size in a second cold mold of larger volume than the first hot mold. Such containers are stated as having improved mechanical properties, particularly very high hoop yield stresses. The subsequent quenching of an article in the larger cold mold causes the stresses induced during the reblowing in the larger cold mold to be frozen. As a result, the onset-of-shrinkage temperature is reduced because the frozen-in stresses will be relaxed at lower temperatures, as contrasted to a container that does not have frozen-in stresses. In a second embodiment, a container is blow molded in a hot blow mold, then reblown to a larger size in a second hot blow mold where it is blown to the confines of of the second mold and the container is then removed from the second hot mold and transferred to a third cold mold and cooled to room temperature while maintaining internal pressure. This would substantially increase the overall cycle time. Such a method used commercially would involve increased capital investments, complex machinery and greater operating costs. In a further embodiment, the container is blow molded in a first hot mold, reblown in a second hot mold, and thereafter the second mold is cooled to cool the container. This would substantially increase the cycle time since the second mold must be cycled between hot and cold temperatures which requires substantial time.

U.S. Pat. No. 4,385,089 (British Patent Specification No. 1,604,203) is directed to heat set biaxially oriented hollow articles and states that the preform or parison should be heated at least to biaxially oriented temperature and maintained in closed contact with a hot mold which is at a temperature of up to 40° C. above the minimum orientation temperature. In one embodiment, the resultant molded hollow article is moderately cooled, causing a temperature drop of 10°–30° C., by introducing cooling vapor or mist into the hollow article, interrupting the cooling vapor and opening the mold. In another embodiment, the heat set article is allowed to shrink freely and then reblown in the same hot mold or in a separate cooled mold. The heat setting is 130° C. or less. As a result, a lower onset-of-shrinkage temperature will be obtained. Furthermore, where the heat set article is permitted to shrink freely before being reblown, there would be a loss of mechanical properties, difficulty in obtaining proper material distribution in the reblown article and increased cycle time involved in reblowing.

Accordingly, among the objectives of the present invention are to provide an improved method for making biaxially oriented heat set poly(ethylene) terephthalate containers which have onset-of-shrinkage and mechanical properties as required for hot-fill applications and, at the same time, a method which provides substantially lower cycle times.

In accordance with the invention, the method comprises engaging the open end of a plastic parison which is at a temperature within its molecular orientation temperature range, enclosing a hot mold about the hot parison, the mold being at heat setting temperature, expanding the plastic parison within the hot mold by internal pressurization to induce biaxial orientation of the plastic parison and force the plastic parison into intimate contact and conformance with the hot mold and to maintain contact by such internal pressurization between the mold and the biaxially oriented container for a time sufficient to induce partial crystallization in the biaxially oriented container, maintaining a lower internal pressurization of the container to prevent significant shrinkage, opening the hot mold while maintaining engagement of the open end of the blown hollow container, enclosing the blown hollow container in a cold mold having substantially the same volume as the hot mold, or smaller, increasing the pressurization to force the container into intimate contact with the cold mold to cool the container while maintaining internal pressurization and then exhausting the pressure and opening the cold mold. The method results in a thermally stable container.

DESCRIPTION

Figure 1:
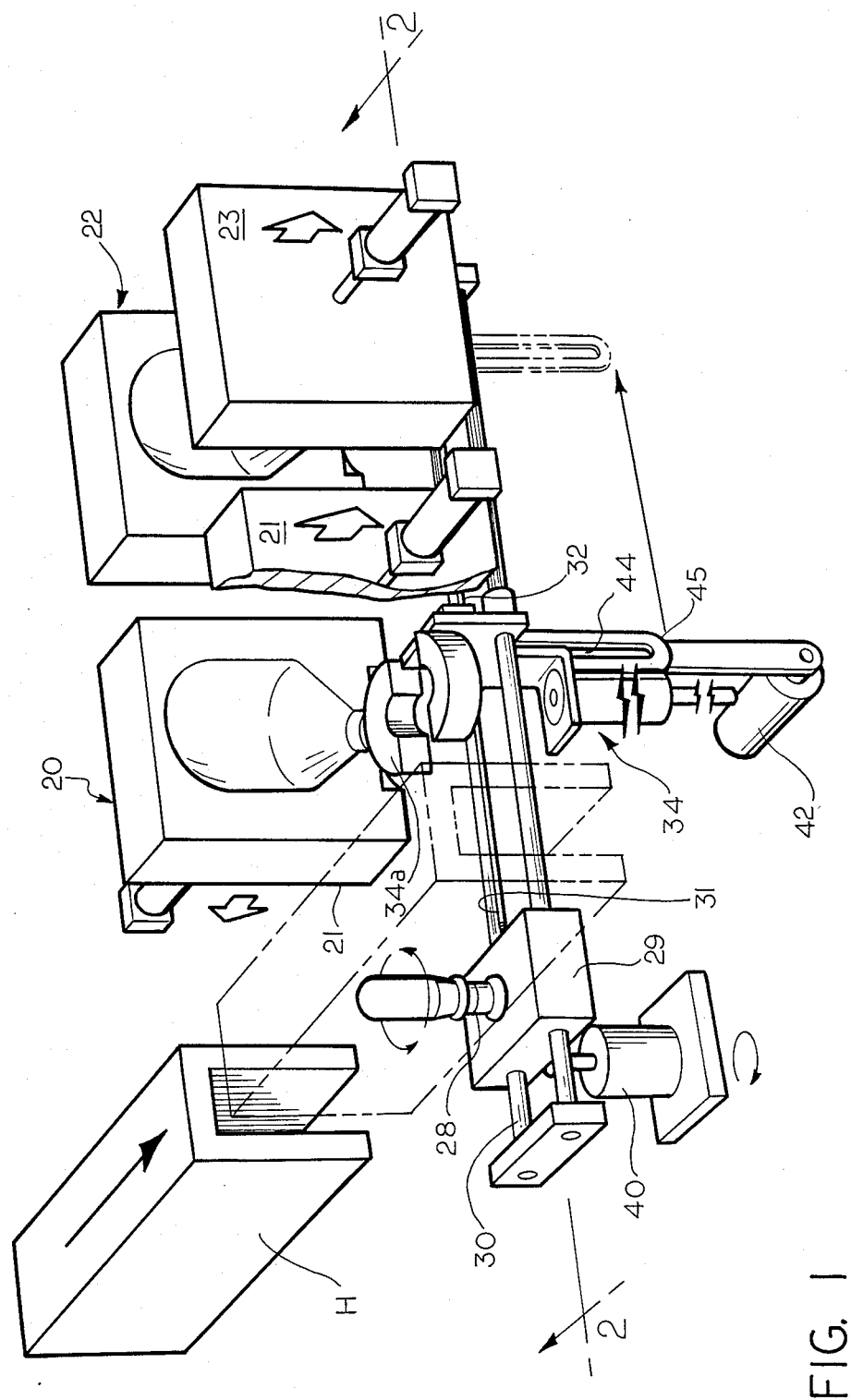
FIGS. 1 is a partly diagrammatic view of an apparatus for performing the method comprising the invention, parts being broken away.
Figure 3:
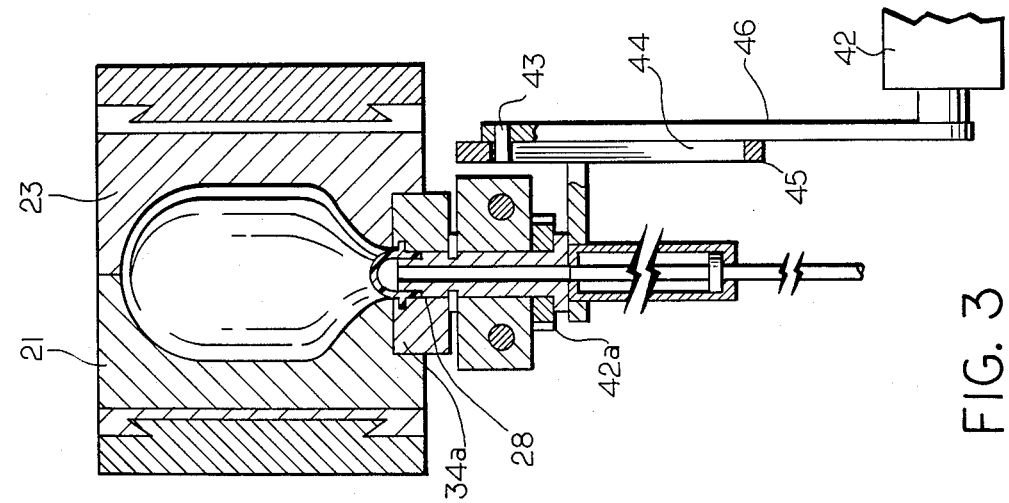
FIG. 3 is a sectional view taken along the line 3—3 in FIG. 2 showing the parts in position with the hot mold closed about a parison.
Figure 2:
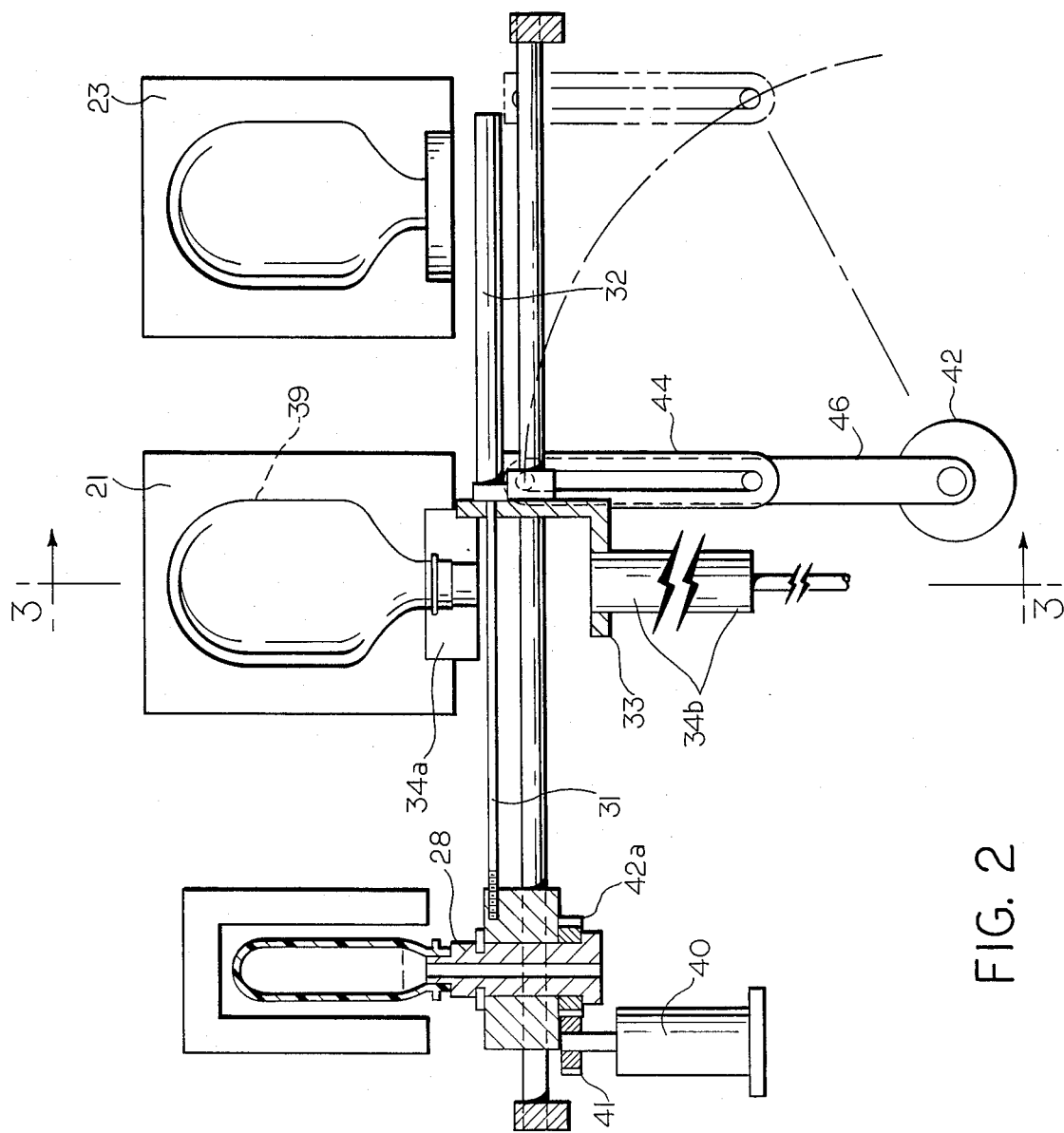
FIG. 2 is a fragmentary sectional view taken along the line 2—2 in FIG. 1, showing the hot mold closed.

Referring to FIGS. 1-3, an apparatus embodying the invention comprises a stationary sectional hot mold 20 which comprises sections 21 movable toward and away from one another by suitable apparatus such as pneumatic cylinders. The mold 20 is adapted to be heated so that when a parison is blown to the confines of the mold cavity, the resultant article is also heat set. The apparatus further includes a cold mold 22 that has mold sections 23 movable toward and away from one another by suitable apparatus to form a cavity substantially identical in size to the cavity of the mold 20, or smaller.

The apparatus includes a conditioning station A at which a parison or preform P supported on a mandrel 28 is positioned for heating and equilibrating the parison to an orientation temperature. The apparatus further includes a blowing and heat setting station B at the hot mold 20 and a quenching station C at the position of cold mold 22.

A mandrel 28 supporting a parison P is mounted on a block 29 movable on track 30 defined by spaced rods. The block 29 is connected to a piston rod 31 of a cylinder 32 mounted on a bracket 33 on which a clamping and blow pin assembly 34 is mounted. The bracket 33 is also mounted for movement on track 30. The clamping and blow pin assembly 34 comprises the halves of a clamp ring 34a and a blow pin assembly 34b. The neck clamping halves are opened and closed by a fluid cylinder as is well known in the art.

A clamping and blow pin assembly 34 is mounted for movement longitudinally on the tracks 30. A cylinder 40 at station A is adapted to rotate a pinion 41 which engages a gear 42a on the mandrel 28 to rotate the mandrel 28 at station A. A rotary cylinder 42 provides oscillating movement of an arm 46 which has a pin 43 thereon engaging a slot 44 in a link 45 fixed on bracket 33 to translate the bracket 33 and clamping and blow pin assembly 34 along track 30 between stations B and C.

Initially, a parison P is placed at position A on mandrel 28 and is heated to the orientation temperature in a heating channel H and maintained for a given period of time at the temperature in order to equilibrate the inside and outside temperature of the parison. The cylinder 32 is then actuated to bring the parison P to the hot blow molding and heat setting station B. The mold 20 is closed about the neck clamp 34a. The parison is extended by fluid pressure through the blow pin assembly 34b to the confines of the hot mold 20 to produce a biaxially oriented container. The contact with the confines of the mold is maintained by maintaining the internal pressurization for a given period of time to heat set the container. The blowing pressure is then reduced to a lower transfer pressure, the hot mold 20 is opened and the clamping and blow pin assembly 34 is moved to the quenching station C. During the transfer of the blown article to the cold mold, the article is maintained in stable controlled condition with the interior of the container under pressure, thus minimizing any tendency of the container to deform or shrink. At the quenching station, the container is reblown and held against the confines of the cold mold 22 by pressure and quenched while maintaining the pressure within the container. The pressure in the container is then exhausted. The cold mold 22 is then opened, and the clamping and blow pin assembly 34 is returned to position B and mandrel 28 is returned to position A along with the container and then the container is removed.

Figure 4:
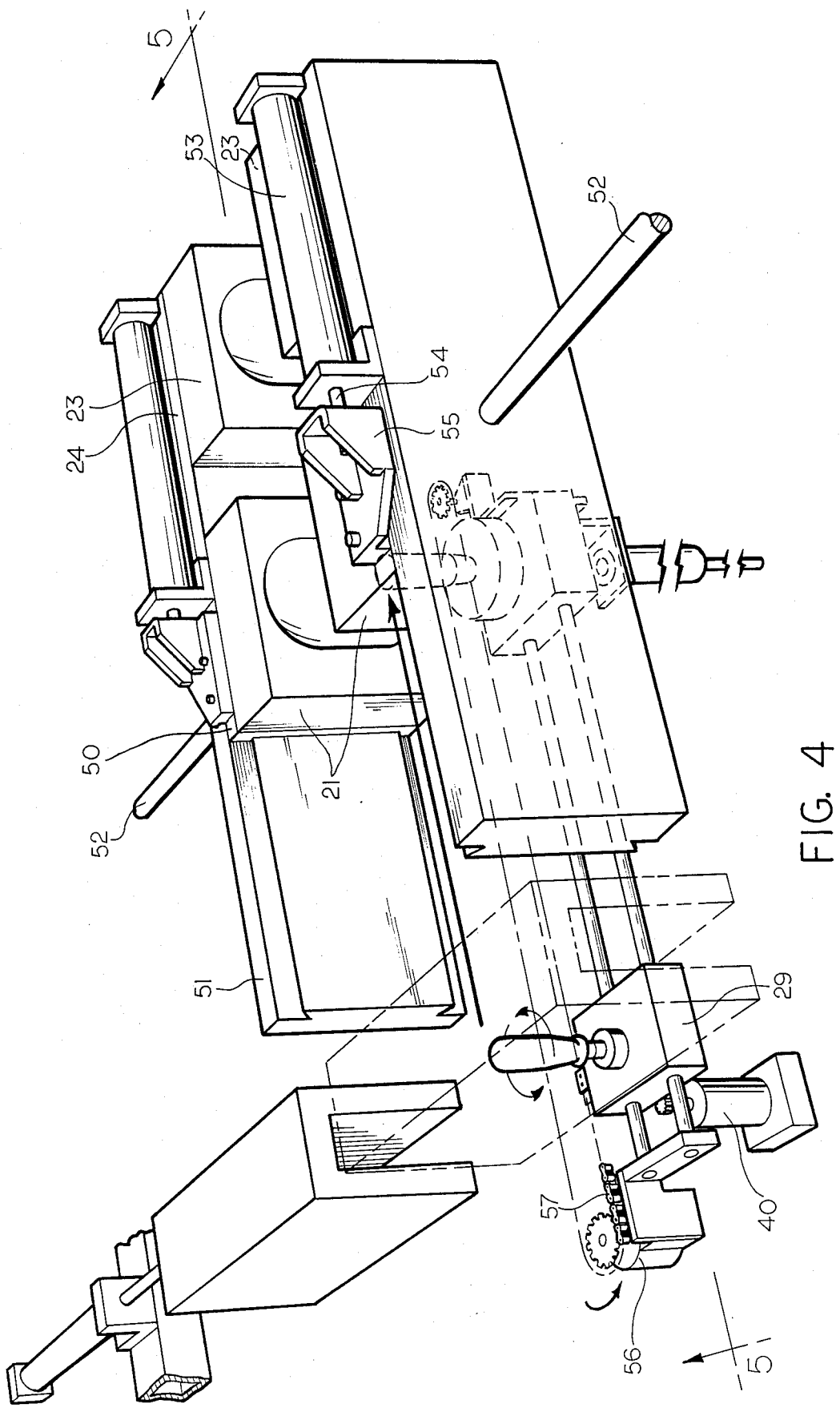
FIG. 4 is a partly diagrammatic view of an apparatus for performing a modified form of the method.
Figure 5:
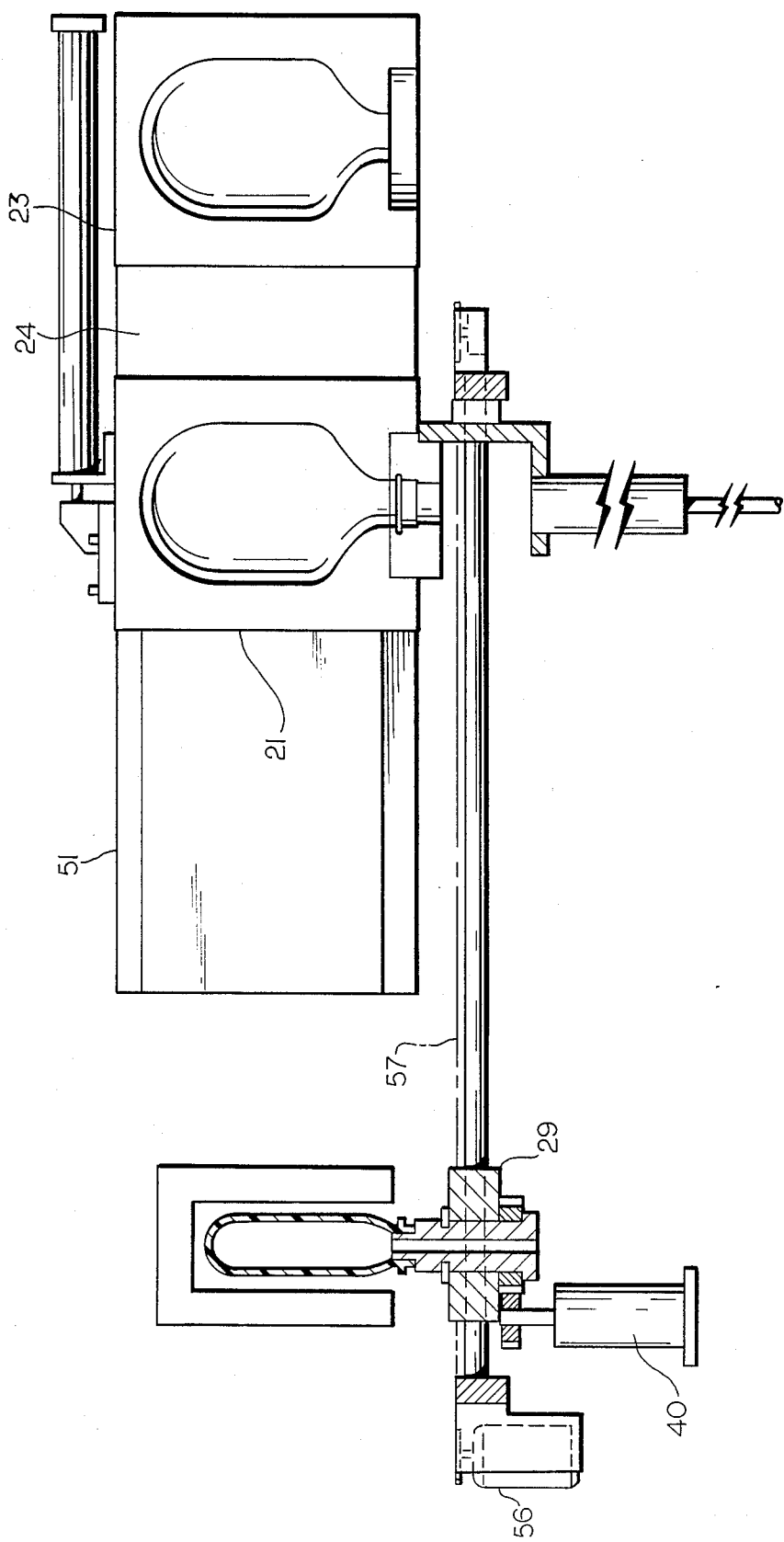
FIG. 5 is a fragmentary sectional view of the modified apparatus taken along the line 5—5 in FIG. 4.

In the modified method as shown in FIGS. 4 and 5, the clamping and blow pin assembly is maintained stationary while the hot mold 20 and cold mold 22 are moved longitudinally to transfer the blown container from the hot mold to the cold mold. In this form, the mold halves 21, 23 are mounted on a slide 50 which in turn is mounted on a platen 51. The platens are moved transversely in and out of position to open and close the molds by cylinders, the shafts 52 of which are shown. The movement of the slide 50 along the platen 51 is achieved by a cylinder 53 which has its piston rod 54 connected by a bracket 55.

In this form, the transfer of the mandrel base 29 between the parison heating station A and the blowing and heat setting station B is achieved by a reversible electric motor 56 which drives a chain 57 connected to the mandrel base 29 to move its between positions A and B.

In all other respects the method is substantially similar and the same cycle is provided.

When the plastic material is poly(ethylene) terephthalate, typically, the hot mold is maintained at a temperature ranging between about 130° C. and 250° C. and the cold mold is maintained at a temperature ranging between about 1° C. and about 100° C.

The cavity of the mold at station C may have the same volume as the cavity of the mold at station B. The volume of the hot mold being measured when the hot mold is at the heat setting temperature and the volume of the cold mold is at the quenching temperature. In another embodiment, the cold mold is smaller than the hot mold and the container is allowed to shrink slightly by reducing the transfer pressure to a predetermined lower volume, before the hot mold is opened.

The process of the present invention, as well as the product, is especially concerned with polymers of poly(ethylene) terephthalate having an inherent viscosity of at least 0.6. Poly(ethylene) terephthalate polymers useful in the present invention include repeating ethylene terephthalate units with the remainder being minor amounts of ester-forming components and copolymers of ethylene terephthalate wherein up to about 10 mole percent of the copolymer is prepared from the monomer units selected from butane-1,4-diol; diethylene glycol; propane-1,3-diol; poly tetramethylene glycol); poly ethylene glycol); poly(propylene glycol); 1,4-hydroxymethylcyclohexane and the like, substituted for the glycol moiety in the preparation of the copolymer, or isophthalic; naphthalene 1,4- or 2,6-dicarboxylic; adipic; sebacic; decane-1,10-dicarboxylic acids, and the like, substituted for up to 10 mole percent of the acid moiety (terephthalic acid) in the preparation of the copolymer.

Of course, the poly(ethylene) terephthalate polymer can include various additives that do not adversely affect the polymer. For instance, some such additives and stabilizers, e.g., antioxidants or ultraviolet light screening agents, extrusion aids, additives designed to make the polymer more degradable or combustible, and dyes or pigments. Moreover, cross-linking or branching agents such as are disclosed in U.S. Pat. No. 4,188,357 can be included in small amounts in order to increase the melt strength of the poly(ethylene) terephthalate.

The process is also applicable to multilayer parisons comprising an orientable heat settable polymer and other polymers which provide desirable barrier properties wherein the orientable heat settable polymer comprises a major portion of the total weight, preferably at least 70%. Typical examples are multilayer parisons of poly(ethylene) terephthalate and copolyester; poly(ethylene) terephthalate, nylon and copolyester; poly(ethylene) terephthalate, adhesive, nylon, glue and poly(ethylene) terephthalate.

The process is also applicable to blends of poly(ethylene) terephthalate with polymers which provide desirable barrier properties wherein the poly(ethylene) terephthalate comprises a major portion of the total weight, preferably at least 70%.

Thus, as used in the specification and claims, the term poly(ethylene) terephthalate shall include the above discusses materials containing poly(ethylene) terephthalate.

Although the method has been described by utilizing parisons which are heated and the blown and heat-set, some of the advantages are also applicable to heat setting previously blown containers wich are positioned between the halves of a hot mold at station B to heat set the container and then transferred to a cold mold at station C while maintaining engagement of the neck and bottom.

Where poly(ethylene) terephthalate has been used, the following parameters produce optimum results:

TABLE I

| | Heat Set Parameters | |
|---|---|---|
| | Broad Range | Preferred Range |
| 1. Heat Set Temperature | 130–250° C. | 200–230° C. |
| 2. Heat Set Time | 0.5–10 sec. | 1–2 sec. |
| 3. Transfer Press | 1–30 psi | 5–20 psi |
| 4. Transfer Time | 0.8–15 sec. | 1–2 sec. |
| 5. Quench Temperature | 1–100° C. | 20–30° C. |
| 6. Quench Time | 0.5–10 sec. | 1–2 sec. |
| 7. Hot Mold Volume / Cold Mold Volume | 0.97–1.3 | 1.0–1.1 |

The following table summarizes typical test results utilizing poly(ethylene) terephthalate having an I.V. of 0.72. The ratio of hot mold volume to cold mold volume was 1.0.

TABLE II

Quench Temperature = 25° C.
Quench Time = 1.3 sec.
Transfer Time = 4 sec.
Transfer Pressure = 25 psi

| HEATSETTING | | DENSITY gm/cc @ | VOLUME* | ONSET |
|---|---|---|---|---|
| °C. | Sec. | mid-wall | 24 hours., cc | Temperature, °C. |
| 121 | 6 | 1.376 | 490.1 | 52 |
| 149 | 6 | 1.381 | 507.9 | 76 |
| 177 | 1.3 | 1.383 | 519.2 | 56 |
| 177 | 6 | 1.387 | 519.4 | 81 |
| 193 | 1.3 | 1.386 | 520.1 | 68 |
| 205 | 1.3 | 1.386 | 520.2 | 75 |
| 205 | 6 | 1.388 | 521.5 | 115 |
| 215 | 1.3 | 1.391 | 521.0 | 93 |
| 230 | 1.3 | 1.392 | 521.2 | 110 |

*nominal overflow volume about 522 cc.

The onset-of-shrinkage temperature referred to herein was determined as described in Brady and Jabarin "Thermal Treatment of Cold-Formed Poly(Vinyl Chloride) Polymer Engineering and Science", pp. 686–90 of Vol. 17, No. 9, September 1977, except that the samples were cut from the sidewalls of the bottles. When inherent viscosity is referred to herein, it is the viscosity as measured in a 60/40 weight ratio phenol/tetrachloroethane solution at 25° C. Density was determined by the method described in ASTM 1505, entitled "Density Gradient Technique".

It can seen seen from the above results that the thermal stability or on-set-of-shrinkage properties are, surprisingly, substantially improved even though the cooling or quench temperatures are below 100° C. In the aforementioned U.S. Pats. Nos. 4,476,170 and 4,512,948, it was indicated that the method therein requires that the quench temperature be 100° C. or higher in order to obtain the maximum benefit of higher on-set-of-shrinkage temperatures. In addition, it can be seen that at the same quench temperature, there will be an increase of onset-of-shrinkage temperature or thermal stability characteristics with increasing heat setting time. In addition, as the heat set temperature is increased, the density is increased as well as the onset-of-shrinkage characteristics. As the heat setting temperature is increased, the post mold shrinkage is reduced and above about 177° C. there is very little post mold shrinkage.

For the overall extension of the parison from the preblown parison shape to the final shape when blown into a one-half liter mold the average hoop extension ratio was 4.69X and the average axial extension was 2.43X.

TABLE III

Onset of Shrinkage
Heat Set Conditions

Heat Set Temperature = 230° C.
Heat Set Time = 1.3 sec.
Quench Temperature = 25° C.
Quench Time = 1.3 sec.
Transfer Pressure = 24 psi
Transfer Time = 7-8 sec.

| Container | Onset of Shrinkage, °C. |
|---|---|
| A. Same size hot and cold mold | 110° C. |
| B. 18% smaller first heat set mold | 65° C. |
| C. 30% smaller first heat set mold | 69° C. |
| D. 50% smaller first heat set mold | 63° C. |
| E. Non-heat set control | 50° C. |

In the above example, the size of the cold mold was one-half liter in all of the cases.

It can be seen that when the size of the cold mold is larger than the size of the hot mold, at operating temperatures, the onset-of-shrinkage temperature is substantially reduced. When the size of the hot mold and the size of the cold mold are the same, higher onset-of-shrinkage temperatures are achieved.

When the size of the cold mold is smaller than the size of the hot mold, further improvement in onset-of-shrinkage will be achieved.

TABLE IV

Mechanical Properties
Heat Set Temperature = 230° C.
Heat Set Time = 1.3 sec.

| Properties | | Axial | Hoop |
|---|---|---|---|
| Modulus, kpsi | $\bar{x}$ | 443 | 799 |
| | $\sigma$ | 20 | 47 |
| Yield stress, kpsi | $\bar{x}$ | 14.1 | 31.5 |
| | $\sigma$ | 0.5 | 1.7 |
| Yield strain,% | $\bar{x}$ | 5.9 | 6.0 |
| | $\sigma$ | 0.2 | — |
| Ultimate strength, kpsi | $\bar{x}$ | 11.5 | 44.8 |
| | $\sigma$ | 0.2 | 1.7 |
| Ultimate elongation, % | $\bar{x}$ | 42 | 17 |
| | $\sigma$ | 9 | 4 |

Modulus is the measure of the stiffness of the containers, as defined by ASTM standard D-638.

Yield stress is defined as the resistance to creep under heat and/or pressure of a container wall portion, as defined by ASTM standard D-638.

Yield strain is defined as the percent of elongation to which a section of containers may be subjected and then not return 100% to its original dimensions of elastic recovery, as defined by ASTM standard D-638.

Ultimate elongation is a measure of impact strength of the material, as defined in ASTM standard D-638.

It can thus be seen that the containers have excellent mechanical properties in addition to good onset-of-shrinkage temperatures and reduced post mold shrinkage.

The barrier properties of containers made in accordance with the method are summarized in the following table:

TABLE V

Barrier Properties
Whole Package Oxygen Barrier
Heat Set Temperature = 230° C.
Heat Set Time = 1.3 sec.

| Half Liter PET Bottle | | Oxygen Transmission cc/day/atmosphere |
|---|---|---|
| Non-Heat Set A | | 0.141 |
| Non-Heat Set B | | 0.146 |
| | Average: | 0.1435 |
| Heat Set A | | 0.113 |
| Heat Set B | | 0.111 |
| | Average: | 0.112 |
| Improvement: | | 22% |

A method employing a Hersch coulometric detector was used to determine oxygen barrier properties of containers. The apparatus is similar to an Oxtran 100 Permeation Analyzer manufactured by Modern Controls, Elk River, Minn. A test fixture was used to establish oxygen and nitrogen gases at one atmosphere absolute at the outside and inside surfaces of the container respectively. Oxygen surrounding the outside surface was continuously replaced by a flowing gas stream which was vented to the atmospheric environment. The nitrogen gas inside the container was also a flowing system and served as a sweep gas. Oxygen permeated through the wall from the outside to the inside of the container where it was picked up by the nitrogen sweep gas and carried to the coulometric detector for measurement and venting to atmosphere. The output of the detector is directly proportional to the amount of oxygen it receives and calibration is computed from well established laws of electrochemistry. Both oxygen and nitrogen gases were moisturized by bubbling through tubes of water prior to entering the test fixture. Test temperature was controlled by placing the apparatus in a closed room which was maintained at 73°±2° F.

It can be seen that the biaxially oriented heat set containers have improved oxygen barrier properties over biaxially non-heat set containers utilizing the same cold mold.

It can thus be seen that the present method involves the following steps:

1. engaging the open end of a plastic parison which is at a temperature within its molecular orientation temperature range;

2. enclosing a hot mold about the parison, the mold being at heat setting temperature;

3. expanding the plastic parison within the hot mold by internal pressurization through the open end to induce biaxial orientation of the plastic parison and force the plastic parison into intimate contact and conformance with the hot mold and to maintain contact by such internal pressurization between the mold and the biaxially oriented container for a time sufficient to induce partial crystallization in the biaxially oriented container;

4. maintaining a lower internal pressurization of the container to prevent significant shrinkage;

5. opening the hot mold while maintaining engagement of the open end with the blown hollow container;

6. transferring the container to a cold mold having substantially the same volume as said hot mold, or smaller;

7. enclosing the cold mold about the container and increasing the internal pressurization to force the container into intimate contact between the cold mold and the biaxially oriented container to cool the container while maintaining the internal pressurization;

8. exhausting the pressurization to atmospheric pressure; and 9. opening the cold mold.

The method produces unexpected and surprising results in that the onset-of-shrinkage properties are increased even though the quench temperatures do not exceed 100° C. It is believed to be critical to the present method that the cold mold have substantially the same volume as the hot mold, or smaller.

I claim:

1. A method for making a partially crystalline, biaxially oriented heatset hollow plastic container from a hollow parison of polyethylene terephthalate having an open end and a closed end comprising: engaging the open end of a plastic parison which is at a temperature within its molecular orientation temperature range by a clamping and blow pin assembly, enclosing a hot mold at a temperature ranging between about 177° C. and 230° C. about the parison, said mold being at heatsetting temperature, expanding said plastic parison within said hot mold by internal pressurization to induce biaxial orientation of the plastic parison and to force the plastic parison into intimate contact and conformance with the hot mold and to maintain contact between the mold and the biaxially oriented container for a time sufficient to induce partial crystallization in the biaxially oriented container, thereafter maintaining a lower internal pressurization of the container to prevent significant shrinkage of the blown container when the hot mold is opened, opening the hot mold while maintaining said lower internal pressurization and while maintaining engagement of the clamping and blow pin assembly with the blown hollow container, and transferring the biaxially oriented container adjacent a cold mold, the cold mold being at a temperature of about 1° C. to 100° C. and having substantially the same volume as said hot mold, or smaller, by relatively moving the clamping and pin assembly while maintaining the reduced internal pressurization, the ratio of the volume of the hot mold to the volume of the cold mold ranging between about 1.0 and 1.1, maintaining the blown hollow container in stable controlled condition with the interior of the container under said lower internal pressurization, and minimizing any tendency of the container to deform or shrink, and enclosing the container in the cold mold by closing the cold mold about the clamping and blow pin assembly and increasing the internal pressurization to force the container into intimate contact with the cold mold to cool the container, exhausting the pressurization to atmospheric pressure, opening the cold mold, removing the container, the container having an on-set of shrinkage temperature of at least about 56° C. and a post-mold shrinkage of no more than about 0.54%, and moving the clamping and blowing pin assembly relative to the hot mold and cold mold to bring the clamping and blow pin assembly into position adjacent the hot mold.

2. The method set forth in claim 1 wherein said relative movement between the clamping and blow pin assembly and the hot mold and cold mold is achieved by moving the clamping and blow pin assembly and maintaining the hot mold and the cold mold stationary.

3. The method set forth in claim 1 wherein said relative movement between the clamping and blow pin assembly and the hot mold and cold mold is achieved by moving the hot mold and the cold mold while maintaining the clamping and blow pin assembly stationary.

4. The method set forth in claim 1 including the step of heating the hot parison to the molecular orientation temperature and the step of transferring the hot parison to a position adjacent the hot mold for engagement by the clamping and blow pin assembly.

5. The method set forth in claim 1 wherein the heat set time ranges between 0.5 and 10 seconds, the transfer time ranges between 0.8 and 15 seconds, and the quench time ranges between 0.5 and 10 seconds.

6. The method set forth in claim 1 wherein said hot mold is at a temperature ranging between about 200° C. and 230° C. and said cold mold being at a temperature ranging between about 20° C. and 30° C.

7. The method set forth in claim 6 wherein the heat set time ranges between 1 and 2 seconds, the transfer time ranges between 1 and 2 seconds, and the quench time ranges between 1 and 2 seconds.

8. A method as defined in claim 6 in which the heat set time is about 1.3 seconds and the quench time is about 1.3 seconds.

9. A method as defined in claim 1 in which the volume mold ratio is about 1.0.

10. A method as defined in claim 1 in which the volume ratio is about 1.1.

11. A method for making a partially crystalline, biaxially oriented heat set hollow plastic container from a hollow parison of polyethylene terephthalate having an open end and a closed end comprising: engaging the open end of a plastic parison by engaging the open end between clamping members and a mandrel, said parison being at a temperature within its molecular orientation temperature range, enclosing a hot mold about the parison, said mold being at heat setting temperature, expanding said plastic parison within said hot mold at a temperature ranging between about 177° C. and 230° C. by internal pressurization through the open end to induce biaxial orientation of the plastic parison and to force the plastic parison into intimate contact and conformance with the hot mold and to maintain contact by such internal pressurization between the mold and the biaxially oriented container for a time sufficient to induce partial crystallization in the biaxially oriented container, engaging the open end between clamping members and a mandrel, maintaining a lower internal pressurization of the container to prevent significant shrinkage, opening the hot mold while maintaining engagement of the clamping members and mandrel with the open end of the blown hollow container, transferring said hollow container to a cold mold, the cold mold being at a temperature of about 1° C. to 100° C. and having substantially the same volume as said hot mold, or smaller, by relatively moving the clamping members and mandrel while maintaining the reduced internal pressurization, the ratio of the volume of the hot mold to the volume of the cold mold ranging between about 1.0 and 1.1, maintaining the blown hollow container in stable controlled condition with the interior of the container under said lower internal pressurization and minimizing any tendency of the container to deform or shrink, and enclosing said cold mold about the container and increasing the internal pressurization to force the container into intimate contact with the cold mold to cool the container, exhausting the pressurization to atmospheric pressure, opening the cold mold, the container having an on-set of shrinkage temperature of at least about 56° C. and a post-mold shrinkage of no more than about 0.54%.

12. The method set forth in claim 11 wherein the heat set time ranges between 0.5 and 10 seconds, the transfer time ranges between 0.8 and 15 seconds, and the quench time ranges between 0.5 and 10 seconds.

13. The method set forth in claim 11 wherein said hot mold is at a temperature ranging between about 200° C. and 230° C. and said cold mold being at a temperature ranging between about 20° C. and 30° C.

14. The method set forth in claim 13 wherein the heat set time ranges between 1 and 2 seconds, the transfer time ranges between 1 and 2 seconds, and the quench time ranges between 1 and 2 seconds.

15. A method as defined in claim 11 in which the volume mold ratio is about 1.0.

16. A method as defined in claim 11 in which the volume mold ratio is about 1.1.

17. A method as defined in claim 13 in which the heat set time is about 1.3 seconds and the quench time is about 1.3 seconds.

* * * * *